United States Patent
Arditti Ilitzky et al.

(10) Patent No.: US 11,320,810 B2
(45) Date of Patent: May 3, 2022

(54) MULTIMODAL SENSING IN AUTONOMOUS DRIVING VEHICLES WITH SELF-HEALING CAPABILITIES

(71) Applicant: Intel Corporation, Santa Clara, CA (US)

(72) Inventors: David Arditti Ilitzky, Zapopan (MX); Ignacio J. Alvarez, Portland, OR (US); Julio C. Zamora Esquivel, Zapopan (MX); Paulo Lopez Meyer, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 16/634,542

(22) PCT Filed: Sep. 28, 2017

(86) PCT No.: PCT/US2017/053912
§ 371 (c)(1),
(2) Date: Jan. 27, 2020

(87) PCT Pub. No.: WO2019/066841
PCT Pub. Date: Apr. 4, 2019

(65) Prior Publication Data
US 2020/0278665 A1    Sep. 3, 2020

(51) Int. Cl.
*G05B 19/418* (2006.01)
*G06F 17/16* (2006.01)
(Continued)

(52) U.S. Cl.
CPC .... *G05B 19/41865* (2013.01); *G05B 19/4183* (2013.01); *G05B 19/4185* (2013.01);
(Continued)

(58) Field of Classification Search
CPC .......... G05B 19/41865; G05B 19/4183; G05B 19/4185; G06F 17/16
See application file for complete search history.

(56) References Cited

U.S. PATENT DOCUMENTS 6,598,195 B1    7/2003   Adibhatla et al.
2003/0186663 A1*  10/2003   Chen ...................... G06T 5/40
                                                                      455/226.3

(Continued)

OTHER PUBLICATIONS

International Search Report and Written Opinion dated Jun. 26, 2018 for International Patent Application No. PCT/US2017/053912, 15 pages.

*Primary Examiner* — Manuel A Rivera Vargas
(74) *Attorney, Agent, or Firm* — Schwabe, Williamson & Wyatt, P.C.

(57) ABSTRACT

An apparatus for autonomous vehicles includes a perception pipeline having independent classification processes operating in parallel to respectively identify objects based on sensor data flows from multiple ones of a plurality of sensors. The apparatus also includes a sensor monitoring stage to operate in parallel with the perception pipeline and to use the sensor data flows to estimate and track a confidence level of each of the plurality of different sensors, and nullify a deficient sensor when the confidence level associated with the deficient sensor fails to meet a confidence threshold.

25 Claims, 9 Drawing Sheets

(51) Int. Cl.
*G06K 9/62* (2006.01)
*H04L 67/12* (2022.01)

(52) U.S. Cl.
CPC ........... *G06F 17/16* (2013.01); *G06K 9/6218* (2013.01); *G06K 9/6277* (2013.01); *H04L 67/12* (2013.01)

(56) References Cited

U.S. PATENT DOCUMENTS

| | | |
|---|---|---|
| 2012/0265471 A1 | 10/2012 | Hess et al. |
| 2014/0195199 A1 | 7/2014 | Uluyol |
| 2017/0045474 A1 | 2/2017 | Buchholz et al. |

* cited by examiner

MULTIMODAL SENSING IN AUTONOMOUS DRIVING VEHICLES WITH SELF-HEALING CAPABILITIES

CROSS REFERENCE TO RELATED APPLICATIONS

The present application is a national phase entry under 35 U.S.C. § 371 of International Application No. PCT/US2017/053912, filed Sep. 28, 2017, entitled "MULTIMODAL SENSING IN AUTONOMOUS DRIVING VEHICLES WITH SELF-HEALING CAPABILITIES", which designated, among the various States, the United States of America. The entirety of the PCT/US2017/053912 Application is hereby incorporated by reference.

TECHNICAL FIELD

Embodiments of the disclosure are in the field of autonomous or semi-autonomous apparatuses, in particular, to multimodal sensing in autonomous driving vehicles with self-healing capabilities.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Autonomous or semi-autonomous apparatuses, such as self-driving vehicles, unmanned aerial vehicles (UAV, also referred to as drones), or robots, may rely on a multimodal set of sensors to perceive, map, and track the surroundings. The sensors may include several types such as long-range radar, mid-range radar front, night vision camera, video camera, reverse camera, ultrasound, mid-range radar back, or the like. Each type of sensor may have its own advantages and deficiencies.

Once the minimal sensor set is defined, each of these sensors becomes indispensable to safely operate the vehicle. Whenever a sensor of this minimal set malfunctions, the current vehicle behavior is to take action to stop safely by engaging the Emergency Brake System or a similar emergency stopping method applicable to unmanned vehicles as vehicle's autonomy and safety would otherwise be compromised. For this reason autonomous vehicle manufacturers are choosing to provide a superset of the minimal sensor set to provide redundancy per sensor type, which ultimately results in a higher cost and peripheral complexity for the vehicle design.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DESCRIPTION OF THE EMBODIMENTS

Figure 1:
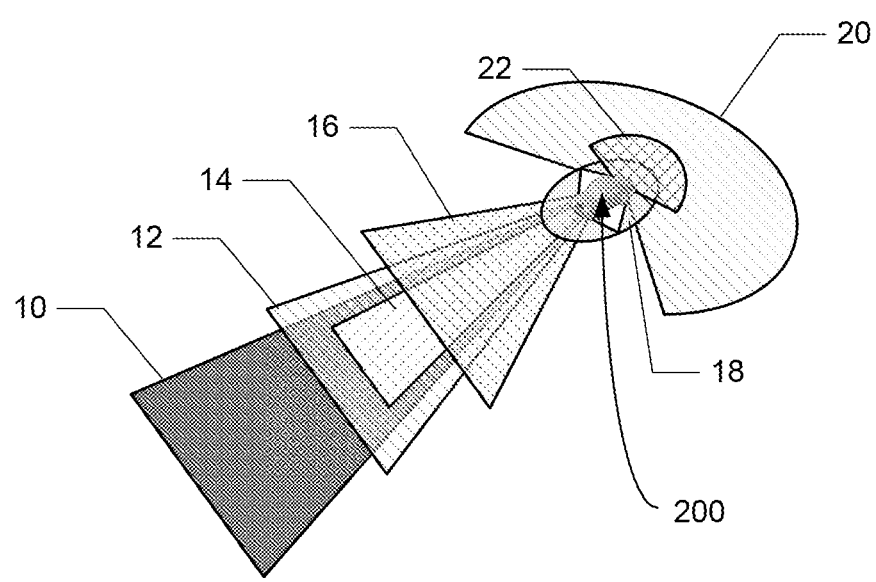
FIG. 1 illustrates a representative multimodal heterogeneous sensor array on an autonomous or semi-autonomous vehicle.

Apparatuses, methods and storage medium associated with multimodal sensing in autonomous vehicles with self-healing capabilities are described.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The embodiments herein provide an autonomous vehicle or other device with a multimodal approach to object detection and classification that is used as input into a traditional fusion grid mechanism. In devices utilizing a multimodal set of sensors, the device may detect and compensate for a sensor deficiency (e.g., sensor inactivity, a sensor malfunction, a sensor failure, a sensor reset, or a security event associated with at least one of the sensors) in one modality by exploiting the information obtained from another modality. This enables a method for robust multi-sensor-based perception, able to sustain autonomy after sensors malfunction. In a further embodiment, sensor malfunction detection capability is extended with self-healing capability for the detected malfunctioning sensors. This enables safe operation without the need to instrument a large superset of a minimal sensor set, thus reducing cost and system-level complexity. The device may be a component of a vehicle (such as a wheeled road or off-road motor vehicle or any other type of vehicle such as a vehicle to operate on rails, an aircraft, a watercraft, a robot, or the like, or combinations thereof) or a non-vehicle such as a stationary surveillance system that uses more than one sensor type.

FIG. 1 illustrates a representative multimodal heterogeneous sensor array on an autonomous or semi-autonomous vehicle operating a perception pipeline with self-healing 200 (as described in FIG. 2), according to the example embodiments. In some applications, each heterogeneous sensor in the sensor array may monitor a different physical space. For instance, in a heterogeneous sensor array in a motor vehicle embodiment, the sensors may monitor different spaces around the motor vehicle such as a particular zone in front of the motor vehicle or a particular zone behind the motor vehicle. Examples of monitored zones around a motor vehicle may include a long range radar zone 10, a mid-range radar front zone 12, a night vision camera zone 14, a video camera zone 16, an ultrasound zone 18, a mid-range radar back zone 20, and reverse camera zone 22, some of which are overlapping (e.g., partially overlapping). Different types of sensors that may monitor the respective zones in front of the motor vehicle may include: ultrasound, video camera (day and/or night vision), mid-range radar, and long range radar, LIDAR (Light Imaging, Detection, And Ranging) or the like. Different types of sensors that may monitor respective zones behind the motor vehicle may include: ultrasound and reverse camera, or the like.

In a traditional autonomous driving sensor-based perception pipeline, each sensor's information is used, standalone, for single-sensor (single-mode) classification of objects of a particular type which is easily identifiable from the information offered by that individual sensor. This means that there are objects detected from either LIDAR, radar or camera only, which later on get fused into a single representation by the fusion grid and is crucial for trajectory planning by the motor vehicle. While this method may be generically categorized as sensor data fusion, this type of fusion does not utilize the total available information (from all the sensors) to optimize each object's detection/classification.

In the traditional perception pipeline setup, a single sensor malfunction may deprive the vehicle from the ability to classify particular objects only perceivable through that sensor. Consequently, the current behavior is that of triggering emergency stop, as autonomy and safety of the vehicle are compromised. This reflects a lack of robustness in the system-level solution due to complete dependency on each sensor in the minimal sensor set. Solutions in the traditional autonomous vehicle perception pipeline are based on the addition of duplicated/redundant sensors, which incurs the drawback of added cost and system-level complexity.

According to the example embodiments disclosed herein, a perception pipeline for autonomous or semi-autonomous vehicles is disclosed that provides a multimodal approach to object detection and classification, with self-healing, rather than existing sensor type based approaches. Independent multimodal classification processes for distinct object types (e.g., lane markings, traffic signs, pedestrians, animals, other vehicles, and the like) operate in parallel, and each of the classification processes subscribe to synchronized sensor data flows from multiple sensors. The object detection and classification makes use of multi-sensor data fusion at a low level (raw-data or extracted feature level) to maximize the information available and increase the classification accuracy. The multimodal approach is pre-trained with worst cases scenarios in which one or multiple sensors in the multimodal sensor suite that feeds each classification process is missing, allowing the classification processes to maintain a predetermined accuracy level during operation over all required combinations of sensor deficiencies during the self-healing process.

Figure 2:
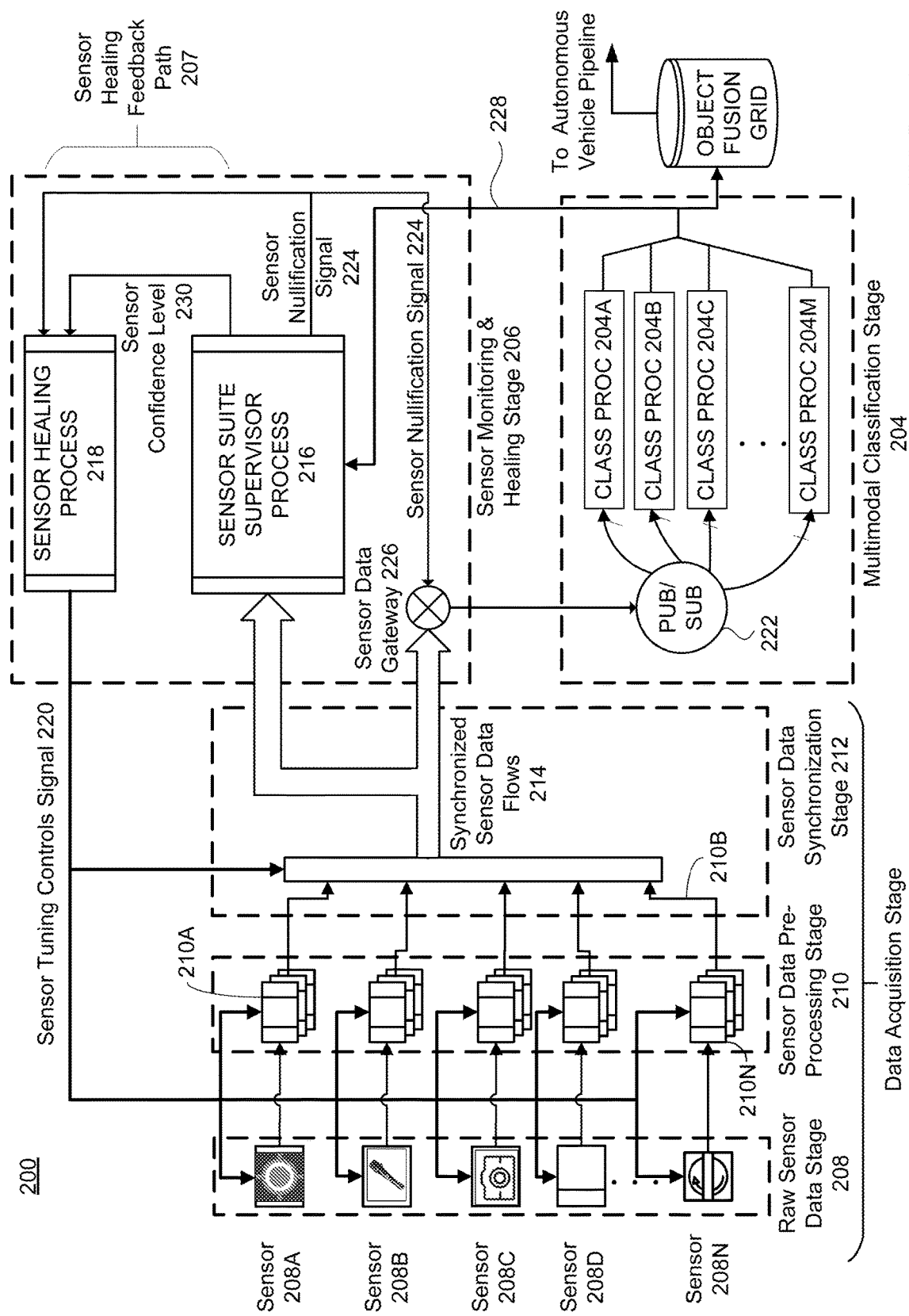
FIG. 2 is a diagram illustrating a multimodal sensor perception pipeline with continuous sensor monitoring and self-healing capabilities.

FIG. 2 is a diagram illustrating a multimodal sensor perception pipeline with continuous sensor monitoring and self-healing capabilities, according to some embodiments. According to one embodiment, the multimodal sensor perception pipeline 200 may be segmented into four main components: a data acquisition stage 202, a multimodal object classification stage 204, a sensor monitoring and healing stage 206, and a sensor healing feedback path 207.

The data acquisition stage 202 acquires data from multiple sensors 208A-208N and communicates the data to the sensor monitoring and healing stage 206 (and indirectly to the multimodal classification stage 204) as synchronized sensor data flows 214. In one embodiment, the data acquisition path 202 may include a raw sensor data stage 208, a sensor data pre-processing stage 210, and a sensor data synchronization stage 212.

The multimodal classification stage 204 includes a plurality of classification processes 204A 204M assigned to identify distinct object types (e.g., lane markings, traffic signs, pedestrians, animals, other vehicles, and the like) in parallel. In one embodiment, each of the classification processes 204A 204M subscribes to any number of the synchronized sensor data flows 214 from multiple different sensors 208A-208N. The multimodal classification stage 204 makes use of multi-sensor data fusion at a low level (raw-data or extracted feature level) to maximize the information available and increase the classification accuracy.

According to one aspect of the disclosed embodiments, the sensor monitoring and healing stage 206 uses all the synchronized sensor data flows 214 to estimate and track a sensor confidence level of each of the different sensors 208A-208N separately, with respect to related sensors, where the synchronized sensor data flows 214 includes the preprocessed data (extracted features) from the sensor data pre-processing stage 210. The sensor monitoring and healing stage 206 operates in parallel with the data acquisition stage 202 and the multimodal classification stage 204. As used herein, the term "parallel" means that the processes operate simultaneously, but not necessarily on the same data. In one embodiment, the sensor monitoring and healing stage 206 includes a sensor suite supervisor process 216, a sensor healing process 218, and a sensor data gateway 226.

The sensor healing feedback path 207 attempts to correct/reconfigure the sensors 208, the sensor pre-processors 210, and optionally the sensor data synchronization stage 212 whenever the sensor confidence level of a corresponding sensor(s) 208A-208N fails to meet the confidence threshold to attempt to restore the deficient sensor to operable confidence levels. In one embodiment, the sensor healing feedback path 207 includes the sensor healing process 218 within the sensor monitoring and healing stage 206 and a sensor tuning control signal 220. The sensor tuning control signal 220 is output by the sensor monitoring and healing stage 206 to any deficient sensor(s) 208A-208N, corresponding sensor data preprocessor(s) 210A-210N, and optionally the sensor data synchronization stage 212. In some cases, the sensor monitoring and healing stage 206 may output the sensor tuning control signal 220 to only the sensor data pre-processors 210A-210N and/or the sensor data synchronization stage 212 when the sensors 208A-208N are operating correctly, but the sensor data pre-processors 210A-210N need to be tuned, and/or the sensor data synchronization stage 212 needs to be re-synchronized.

Figure 3:
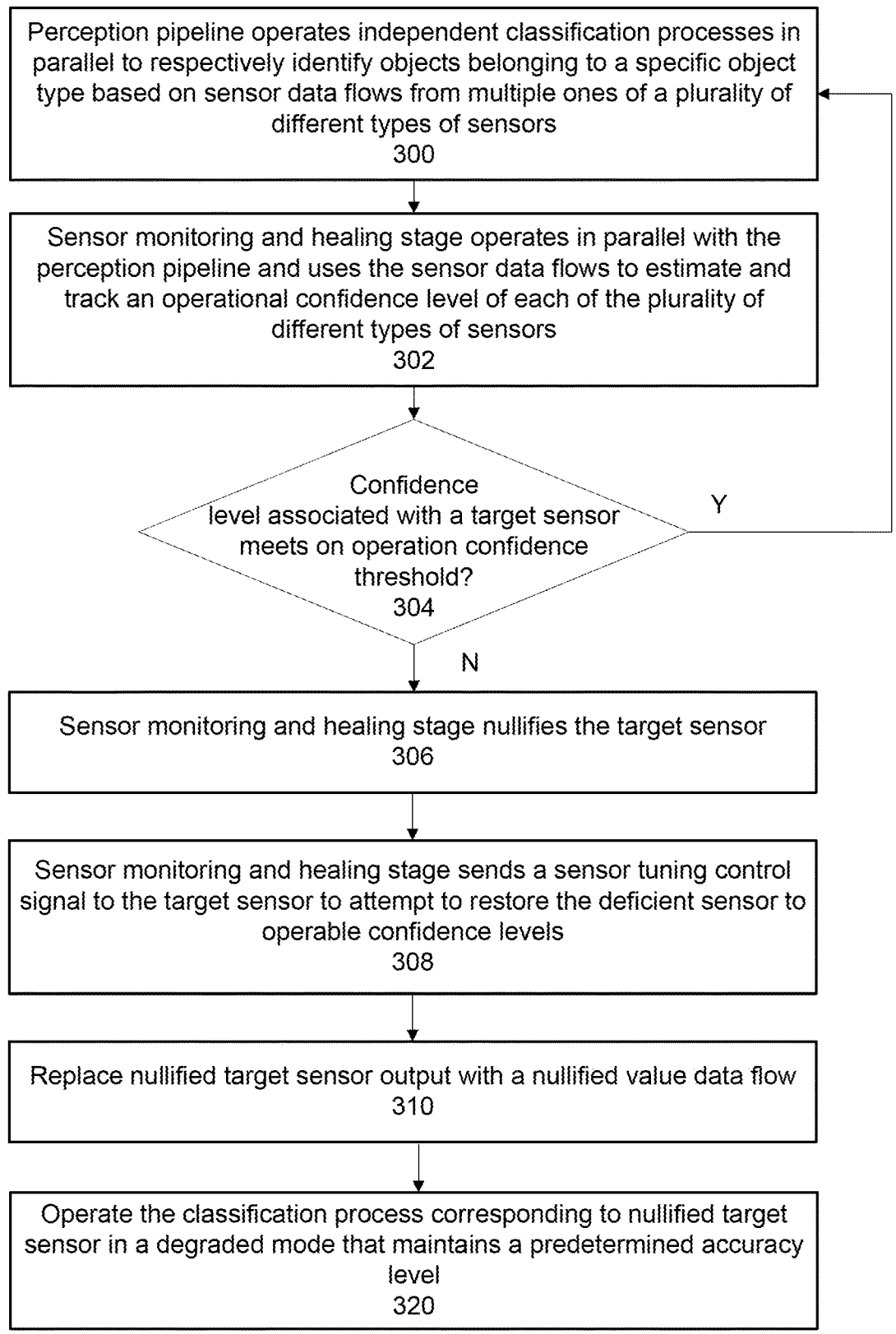
FIG. 3 is a flow diagram illustrating a process performed by the multimodal perception pipeline with sensor monitoring and self-dealing capabilities according to one disclosed embodiment.

FIG. 3 is a flow diagram illustrating a process performed by the multimodal perception pipeline with sensor monitoring and self-healing capabilities according to one disclosed embodiment. The process may begin by the perception pipeline 200 having the plurality of classification processes 204A-204M operate in parallel to respectively identify objects belonging to a specific object type based on the sensor data flows 214 from multiple different sensors 208A-208N (block 300).

The sensor monitoring and healing stage 206 operates in parallel with the perception pipeline and uses the sensor data flows 214 to estimate and track an operational confidence level of each of the plurality of different types of sensors (block 302). In one embodiment, the sensor confidence level is a likelihood of a sensor operating correctly.

When the sensor monitoring and healing stage 206 determines that the confidence level associated with a deficient sensor fails to meet an operational confidence threshold (block 304), the sensor monitoring and healing stage 206 nullifies the deficient sensor (block 306). It should be noted that the sensor nullification signal 224 has no effect on the operation of the deficient sensor in that the deficient sensor continues to operate and generate raw sensor data, as opposed to being "turned off." In one embodiment, the sensor suite supervisor process 216 determines and tracks the confidence level associated with each of the sensors 208A-208N, and sends a sensor nullification signal 224 to both the sensor healing process 218 and the sensor data gateway 226 when the confidence level associated with the target sensor fails to meet the confidence threshold. In one embodiment, the sensor suite supervisor process 216 may include a separate sensor supervisor process to monitor each sensor or sub-set of sensors 208A-208N. In one embodiment, the confidence threshold may represent a minimum likelihood that a deficient sensor is functioning correctly. In one embodiment, the confidence threshold may be a user configurable value for each sensor.

In one embodiment, the sensor suite supervisor process 216 may also send the sensor confidence level 230 to the sensor healing process 218. In one embodiment, the sensor confidence level 230 may be sent whenever the sensor nullification signal 224 is sent. In another embodiment, the sensor confidence level 230 for all the sensors 208A-208N may be continuously sent to the sensor healing process 218.

Responsive to the deficient sensor be nullified, the sensor monitoring and healing stage 206 sends a sensor tuning control signal 220 to the target sensor to attempt to restore the deficient sensor to operable confidence levels (block 308). In further detail, responsive to the self-healing process 218 receiving the sensor nullification signal 224 from the sensor suite supervisor process 216, the self-healing process 218 sends the sensor tuning control signal 220 to the deficient sensor. In one embodiment, the sensor tuning control signal 220 is also sent to the corresponding sensor data preprocessor 210, and optionally to the sensor data synchronization stage 212 The sensor data synchronization stage 212 may also be tuned, so that the sensor being "healed" can be kept is sync (when possible/required) with the rest of the sensors before the deficient sensor is declared to operate correctly again.

The sensor monitoring and healing stage 206 also causes actual sensed data values output from the nullified deficient sensor to be replaced with a nullified value data flow (e.g., a zero-valued constant data flow) (block 310). According to one embodiment, once the sensor data gateway 226 receives the sensor nullification signal 224 from the sensor suite supervisor process 216, the sensor data gateway 226 switches the input of the multimodal classification stage 204 from the sensor data flow 214 of the nullified deficient sensor to a constant nullified value data flow.

Responsive to one of the classification process 204A-204M receiving a constant nullified value data flow as input for the nullified target sensor, the classification process 204A-204M operates in a degraded mode in which the classification process 204A-204M continues identifying the respective object type in absence of the nullified deficient actual sensor data using the sensor data flows of correctly functioning sensors, while maintaining a predetermined accuracy level (block 320). If the number of simultaneously nullified sensors exceeds the capacity of the classification process 204A-204M of maintaining the predetermined accuracy level, then the perception pipeline 200 may fall back to conventional behavior of detecting a sensor failure, which is invoking an emergency braking procedure (or the like) to stop operation of the vehicle in a responsible fashion.

According to one embodiment, replacing the nullified target sensor data output with a nullified value data flow, rather than ceasing the data flow altogether, effectively nullifies the target sensor from the perception pipeline 200 to ensure that only the sensor data from correctly functioning sensors is processed by the multimodal classification stage 204, but without disrupting the object classification processes.

In a further embodiment, the classification processes 204A-204M are trained a priori to operate in the degraded mode in the case of one or more deficient sensors, while allowing the perception pipeline 200 to attempt to correct the deficient sensor. These training cases are added to cover for cases of sensor malfunction, i.e., the training cases assume that any malfunctioning sensor data (non-responsive, non-tuned, artifacts in dataflow, etc.) is replaced by a nullified or zero-valued constant data flow. In one embodiment, the training covers all the possible cases were different subsets of the sensor data flows are nullified, which allows the classification processes 204A-204M to maintain a pre-determined accuracy level during operation over all required combinations of sensor deficiencies. Replacing actual sensor "corrupted" data from a deficient sensor with zero-valued data (by definition, complete absence of information) makes the classification processes 204A-204M simpler to train and to achieve high accuracy of operating in degraded mode.

This ability is critical for commercial vehicles to operate safely in conditions where one sensor or sensor type is temporarily incapacitated (e.g., blinded), permanently incapacitated or under attack. Furthermore, this ability allows manufacturers to avoid high orders of sensor redundancy, thus reducing added cost and system-level complexity.

The disclosed embodiments also add robustness without incurring a penalty to real-time operation. That is, no delays are added to the perception pipeline 200, and no pipeline process resets are needed, as the sensor monitoring and healing stage 206 is in parallel with the multimodal classification stage 204 (which is the critical path of the perception pipeline). Moreover, upon detecting a sensor malfunction, the disclosed embodiments will not require re-synchronization of the correctly operating sensor data flows 214. Note, that during the self-healing process, before un-nullifying a previously nullified target sensor, there could be a need to re-synchronize that sensor. Nonetheless, at the time when a sensor is nullified (as soon as it was detected to have low confidence), there may be no need to resynchronize.

Additional details of the components comprising the perception pipeline 200 are disclosed below.

Referring again to FIG. 2, the raw sensor data stage 208 may include a heterogeneous sensor array having a plurality of different types of sensors 208A-208N that preferably have individual configurable or tunable features. Initially, the sensors 208A-208N produce data continuously (either raw data or interpreted data). The data from each of the sensors 208A-208N may be input to one or more simultaneous reconfigurable sensor data pre-processors 210A-210N that may perform simple data adaptation functions, such as simple filtering, reformatting, and the like, or more complex feature extractions. Multiple pre-processors 210 may exist for the same sensor 208A-208N, thus enabling multiple varieties of features to be simultaneously extracted from the same sensor 208A 208N. In one embodiment, a one-to-many relation may exist between raw sensor data from each of the sensors 208A-208N and the corresponding sensor data pre-processors 210A-210N. That is, raw data from a single sensor 208A, for example, may be fed to multiple parallel sensor data pre-processors 210A (each one extracting different features from the data). For this reason, the number of signals (or flows) in the synchronized sensor data flows 214 will be larger-than-or-equal to the number of sensors (N).

All the pre-processed sensor data flows 210B (≥N) are then fed to the sensor data synchronization stage 212 that synchronizes in time all the pre-processed sensor data flows 210B, taking into account the data capturing time disparities and pre-processing time disparities among sensors, and outputs the synchronized sensor data flows 214 to the sensor monitoring and healing stage 206.

Referring now to the multimodal classification stage 204, a feature of the disclosed multimodal perception pipeline 200 is having M parallel and independent multimodal object classification processes 204A-204M, one per object type (e.g., lanes, signs, pedestrians, other vehicles, etc.), where each of classification processes 204A-204M may simultaneously use data from multiple sensors (up to all of them) to increase the available information for classification.

The classification processes 204A-204M require multi-sensor data fusion (MSDF), either at the raw-data or extracted feature level. MSDF can be performed either as a pre-stage to each classification process 204A-204M (e.g. by some parametric method like model-based nonlinear filtering), or it can be embedded into the classification processes 204A-204M (e.g., train a classification process to use as inputs the multi-sensor data and/or features and resolving the fusion implicitly on hidden layers).

In order to enable the multimodal aspect of the classification processes 204A-204M, the present embodiment may utilize a publish-subscribe (pub/sub) mechanism 222 to enable all the required simultaneous sensor data flows 214 from the synchronized sensor data pre-processor outputs 210A-210N to the sensor monitoring and healing stage 206 for forwarding to the corresponding classification processes 204A-204M data inputs. The final configuration of the supported sensor data flows 214 can be hardened during design stage, in which case subscriptions should not change at runtime.

Potential implementations for the publish-subscribe mechanism 222 depend on whether the classification is done in software processes in symmetric multiprocessing (SMP) multi-core like architectures, or in hardware stream processors such as Application Specific Instruction Processors (ASIP) or Field Programmable Gate Arrays (FPGA) engines that can process streams in real-time. When classification processes 204A-204M are implemented as independent hardware components, this pub/sub mechanism 222 could be implemented as a fully connected interconnection network between all synchronized sensor data outputs to all object classifiers, where each classification process 204A-204M has multiple ports to the interconnection network (one per parallel data flow). When classification processes 204A-204M are implemented as software processes mapped to distinct physical cores in a multicore system, the pub/sub mechanism 222 could be implemented as coherent SMP multi-processor mesh networks with distributed NUMA memory architecture with memory access latency guarantees (accounting for coherency).

In order to enable robustness of the classification processes 204A-204M, each classification process 204A-204M must be trained to perform sufficiently well over all required combinations of sensor malfunctions. For this purpose, it is assumed that any malfunctioning and nullified sensor data flow will be replaced by a constant zero-valued data flow. The assumption of zero-valued data flows for malfunctioning sensors simplifies the training of the classification processes 204A-204M for robustness (classifier are trained a-priori for sensor failure), allowing the classification processes 204A-204M to provide sufficient functional safety margins known at design time.

The sensor suite supervisor process 216 analyzes all the synchronized sensor data flows 214 in parallel with the multimodal classification stage 204 and estimates the confidence level of each of the sensors 208A-208N with respect to the data received from all the other statistically related sensors. Used herein, the phrase "statistically related sensors" means that the data output from a set of sensors is statistically dependent (as opposed to the physical sensing mechanisms being related). In one embodiment, the sensor suite supervisor process 216 needs to take into account the confidence of the sensors 208A-208N when calculating confidence of other sensors 208A-208N. That is, sensors with low-confidence should be lowly pondered (or discarded) when estimating the confidence of other sensors.

According the embodiments disclosed herein, the sensor suite supervisor process 216 may estimate of the confidence level of a target sensor by comparing (in different ways) the synchronized sensor data flow of the target sensor to the sensor data flows of a set of statistically related sensors. According to the embodiments disclosed herein, several different methods may be used for the sensor suite supervisor process 216 to compare the synchronized sensor data flow of the target sensor to the sensor data flows of a set of statistically related sensors.

In a first embodiment, a pre-trained sensor translation model is provided for each sensor that takes as inputs the synchronized sensor data flow of the statistically related reference sensors, and generates a predicted output of the target sensor. Thus, the sensor suite supervisor process 216 accesses the pre-trained model of the target sensor to convert sensor data generated from the related sensors into modeled sensor data for the target sensor (e.g., modeling LIDAR data based on related camera and radar data). Pre-trained models may be used to translate raw sensor data (or pre-extracted feature data) from the related sensors, into the representation space corresponding to the target sensor. Note, the "target" refers to the sensor for which the confidence level is being calculated, while "related" or "reference" sensors are all other statistically related sensors. A similarity metric is then calculated between the predicted sensor output from the sensor translation model and actual target sensor data. This can be for example, distances (in a vector space context) between the features extracted from the predicted sensor data and actual sensor data In a second embodiment, the sensor suite supervisor process 216 may compare the synchronized sensor data flows of the target sensor to the synchronized sensor data flows of the set of statistically related sensors by accessing pre-trained belief networks that compute a posteriori probability estimates of features generated from the target sensor given values for features generated by related sensors. The values for the features of the related sensors are taken as soft or uncertain evidence by using their confidence level as a strength (weighting) of the belief in such a sensor. The confidence level is then approximated by the computed a posteriori probability estimates.

In a third embodiment, the sensor suite supervisor process 216 may compare the synchronized sensor data flows from a set of statistically related sensors as follows: i) by computing a similarity/distance metric calculated as a weighted average of the pairwise similarities/distances of each pair of sensors in the set of statistically related sensors, including the target sensor; and ii) by performing real-time clustering and calculating each sensor's distance to a cluster centroid that represents the confidence level, where an outlier of the cluster centroid represents a deficient sensor. Note, that in this case, all the sensors in the "set of statistically related sensors" are both target sensor and reference sensor. Therefore, any sensor in the set may diverge from the centroid of the cluster, becoming the deficient sensor.

In a fourth embodiment, the sensor suite supervisor process 216 may compare the synchronized sensor data flows of the target sensor to the synchronized sensor data flows of the set of statistically related sensors by accessing parametric non-linear filters to fuse features generated from the target sensor and features from the related sensors into a common state space, and generating the confidence level information from the error covariance matrix of the non-linear filter. By analyzing the cells of the parametric non-linear filter error covariance matrix corresponding to the features of the target sensor, a confidence level can be extrapolated.

In a further embodiment, in addition to the object fusion grid 230, the output 228 of the classification processes 204A-204M may be input to the sensor suite supervisor 216 to further improve the confidence level estimation.

In one embodiment, the sensor suite supervisor 216 can be configured with a per-sensor confidence level lower-bound threshold, which determines the minimal confidence level to declare a sensor as functional. To avoid fast switching between nullified/un-nullified status, two different thresholds can be used (lower-bound functional, upper-bound non-functional) to create a hysteresis loop.

Whenever the confidence level of a sensor 208A-208N drops below the threshold, then the sensor 208A-208N is nullified. All sensor nullification signals 224 for the complete sensor suite is fed forward to the sensor data gateway 226, which in turn switches the pub/sub data 222 flow input of any nullified sensor for a constant zero-valued input, until the sensor is "un-nullified". This is how the feedforward path guarantees that the multimodal classification stage 204 always operates in a pre-trained scenario, i.e., no erroneous data forwarded to the classification processes 204A-204M, instead the zero-valued data flow effectively nullifies the effect of a malfunctioning sensor for object classification.

Because the sensor suite supervisor process 216 is parallel to the multimodal classification stage 204, processing latency in the sensor suite supervisor process 216 will not generate delays or bubbles to the multimodal classification stage 204, nor will it impose a resynchronization of currently functional sensor data (i.e. the sensor data flow that got nullified, prior to being un-nullified may need to be re-synchronized, but this resynchronization will not affect the rest of the active (un-nullified) data flows), and therefore it does not cause any negative impact on real-time constraints.

Referring now to details of the sensor healing feedback path 207, whenever a sensor gets nullified the sensor healing process 218 for that sensor can be triggered to execute in parallel to all the previously described processes (thus, it does not add delay, nor does it impact the real-time constraints of the platform). The sensor healing process 218 receives as input the confidence levels and nullification status via sensor confidence level 230 and the sensor nullification signal 224 for each of sensors 208A-208N from the sensor suite supervisor process 216.

The sensor healing process 218 will attempt to "heal" a nullified sensor by sending the sensor tuning controls signal 220. In one embodiment, the sensor tuning controls signal 220 may modify the tuning parameters for the sensor, reconfigure the sensor, reconfigure the sensor's pre-processing blocks 210 reset the sensor, re-synchronize the sensor (without disrupting synchronization of the functional sensors), and the like, while the sensor healing process 218 monitors how the confidence level 230 and nullification status for the sensor respond to the changes. For this reason, while the sensor healing process 218 executes, the nullified sensor and its corresponding pre-processing blocks 210A should continue to operate, and the sensor suite supervisor process 216 may continue to monitor the sensor dataflow 214 of the nullified sensor.

Whenever the sensor healing effort corrects the sensor malfunction (either by recalibrating, readjusting, transforming or filtering signals from the sensor), the sensor suite supervisor process 216 may reactivate ("un-nullify") the sensor into the perception pipeline 200 by the activating the sensor nullification signal 224, which triggers the sensor healing process 218 to finalize.

The operations conveyed in the sensor tuning controls signal 220 sent by the sensor healing process 218 can be of at least three example types: i) a directed recipe of an exact sequence of operations specified by a "sensor expert", which are known to correct pre-identified sensor issues; ii) deterministic optimization that numerically finds the multi-dimensional direction of steepest ascent for the confidence level; and iii) metaheuristic optimization that allows for stochastic/randomness while searching for the best configuration to increase the confidence level.

Example implementations are provided below for the disclosed embodiments. The sensor confidence level estimation aims to determine the sensor or sub-set of sensors diverging from the expected functionality, where the expected functionality is extracted from the collective of the trusted sensors.

Example 1—Bayesian Belief Network Inference supervision. The first example relates to an implementation of the pre-trained belief network that the sensor suite supervisor process 216 may use to predict an output of the target sensor. A simple Bayes Network (BN) can be built, individually, for each one of the sensor supervisor processes comprising the sensor suite supervisor process 216 to estimate the probability that a deficient/malfunctioning sensor is present, considering all the other related sensors' pre-processed input features as evidence for evaluation, i.e. using the related sensors' features as multi-variate random variables, as shown in 4.

Figures 4, 5:
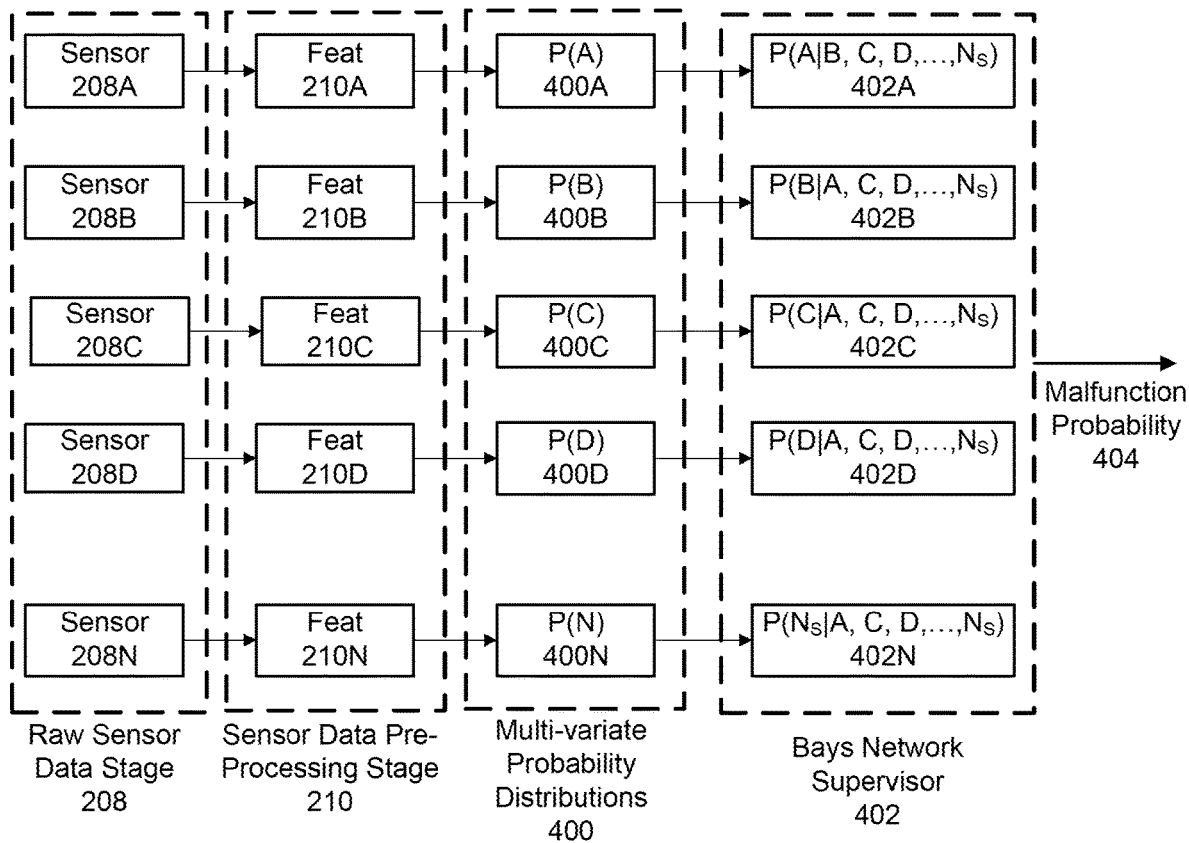
FIG. 4 illustrates a Bayes Network used as a supervisor to estimate the probability of a sensor malfunctioning, given the behavior of all other related sensors.
FIG. 5 illustrates an equation used by Bayes Network supervisor to estimate a probability of a malfunctioning of sensor.
Figure 6:
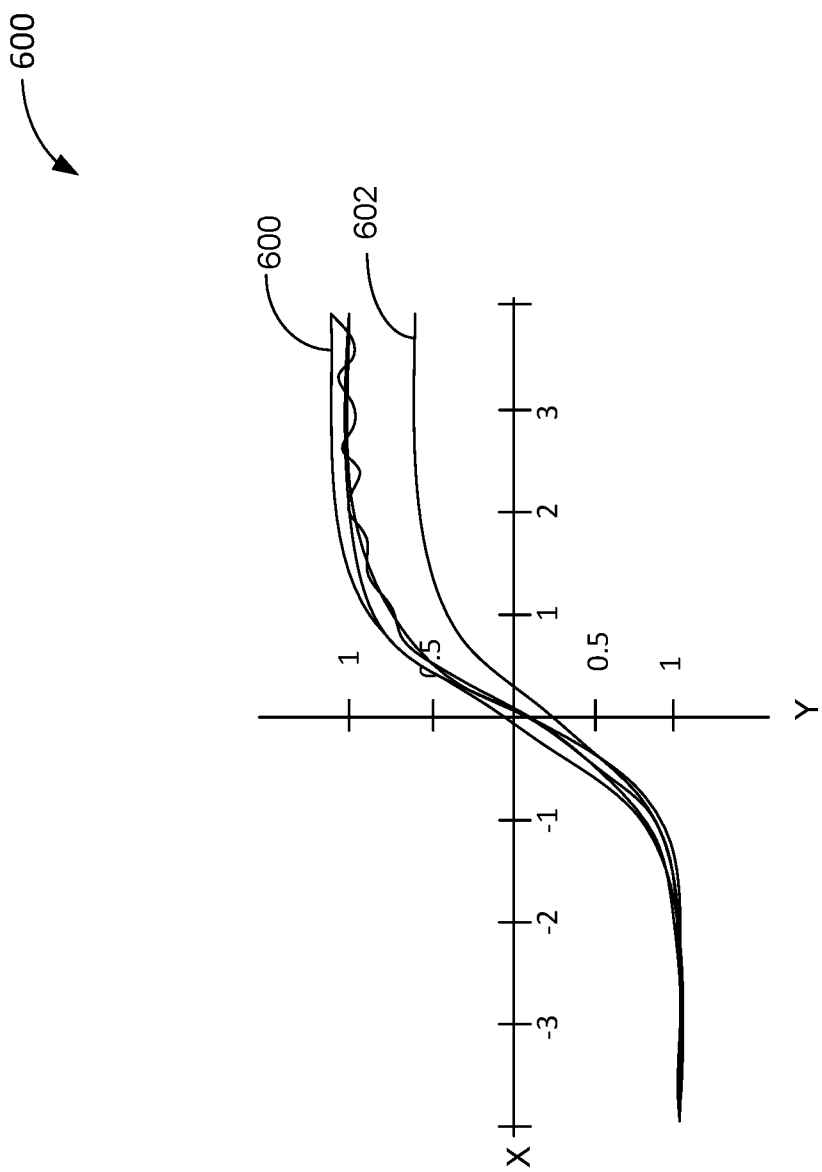
FIG. 6 is a graph comparing one component of a vector descriptor interpreted from different sensors.

FIG. 4 illustrates a Bayes Network used as a supervisor to estimate the probability of a sensor malfunctioning, given the behavior of all other related sensors, which is expected to be high assuming the other sensors are working correctly. The different sensors 208A-208N in the raw sensor data stage 208 output raw sensor data to the sensor data preprocessing state 210 and corresponding features 210A-210N are generated. For each sensor $X_i=\{A,B,C,D,\ldots,N_S\}$ there is a probability distribution $P(X_i)$ 400 based on the observed features extracted from the raw sensor data. From these, a corresponding Bayes Network supervisor 402A-402N can be built to estimate the malfunction probability 404 of each sensor. As an example, Bayes Network supervisor 402A estimates the probability of malfunctioning of sensor 208A, as shown in FIG. 6.

FIG. 5 illustrates an equation used by Bayes Network supervisor 402A to estimate a probability of a malfunctioning of sensor 208A. In this definition, the A posteriori result 500 represents a quantitative probability that sensor 208A at the input is malfunctioning, based on the observed probability distributions 400 of all other sensors features. The evidence 502 represents the joint probability distribution of all other sensors probability distributions and remains fixed; the A priori probability distribution 504 of sensor 208A malfunction is heuristically estimated and considered as the initial belief, and will be constantly updated with new observations. The likelihood 506 is represented by the product of all the probability distributions of all other sensors, given the information of sensor 208A. When the probability of a malfunction in sensor 208A is high (set at a pre-defined threshold), given the observed features probabilities of the other sensors, then the Bayes Network supervisor 402A can alert the perception pipeline 200 in the form of the sensor confidence level 230, shown in FIG. 2. In this approach, there is a Bayes Network supervisor 402 for each sensor in order to have individualistic analysis of a malfunction.

Example 2—Clustering based supervision. In this example, the sensor suite supervisor process 216 creates clusters from the synchronized sensor data flows 214 corresponding to the sensors in a set of statistically related sensors. Such clusters must be created and updated continuously. In general the n-dimensional representation space used for clustering depends on the number of dimensions in the vector descriptor coming from the raw sensor data or the interpreted sensor data (extracted-features), and the method used for clustering is based on unsupervised learning, working in an always learning approach (i.e. the centroids of the clusters are updating its position all the time). The unsupervised method could be, for instance, k-means where k initially is equal to the number of sensors. The following exemplary scenario is used to clarify the clustering method.

The system utilizes only interpreted sensors, this means the data coming from the sensors has a meaning. This data could potentially represent the pose of the vehicle, the distance to the obstacle, etc. In this scenario the number of dimensions necessary to describe the property is small, typically less than 10. To simplify the explanation only one dimension of this descriptor will be graphically represented below.

FIG. 6 is a graph comparing one component of a vector descriptor interpreted from different sensors. In the example shown, the output estimating the component of the vector descriptor from a set of sensors is similar for a set of given components in a given scenario at each time, as shown by the grouping of components 600. However, there is one sensor providing an erratic estimation of the same component 602. After detecting the corresponding outlier sensor, the outlier sensor should be removed from the computation of the average of the "trusted sensor set" corresponding to components 600, which is used to define the reference values and perform the sensor fusion. Also, after detection, the outlier signal may be nullified in the multimodal classification stage 204.

Figure 7:
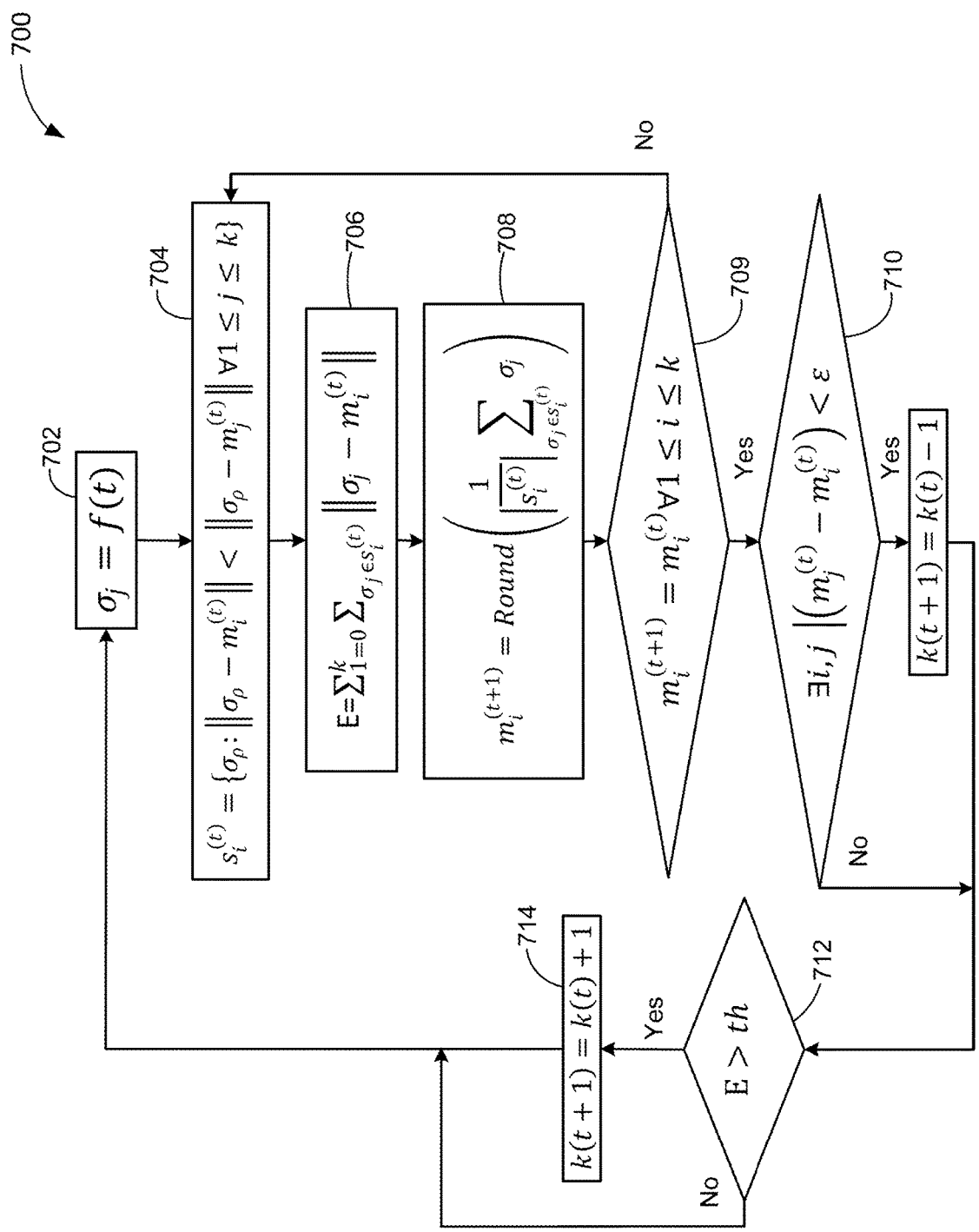
FIG. 7 illustrates an example clustering algorithm that may be used to detect outlier sensor(s).

FIG. 7 illustrates an example clustering algorithm that may be used to detect outlier sensor(s). The algorithm 700 adjusts the number of clusters dynamically having only one cluster when all sensors converge to the same value. A variable, sigma ($\sigma$), is set equal to a function of the sensor output in Block 702. The output of every sensor is associated with a nearest cluster in Block 704. An error is computed in Block 706, which should be a small value when all sensors are operating properly. The centroids for each of the clusters are updated in Block 708. If a sensor is malfunctioning and producing error data, the error data will likely fall in a different cluster. It is determined if the clustering is stable in Block 709. It is then determined if the error is significant in Block 710. It is determined if the error is greater than a threshold in Block 712. If so, the number of clusters is increased in Block 714, and the process continues. The clustering algorithm 700 adjusts the number of clusters dynamically having only one cluster when all sensors converge to the same value.

Figure 8A:
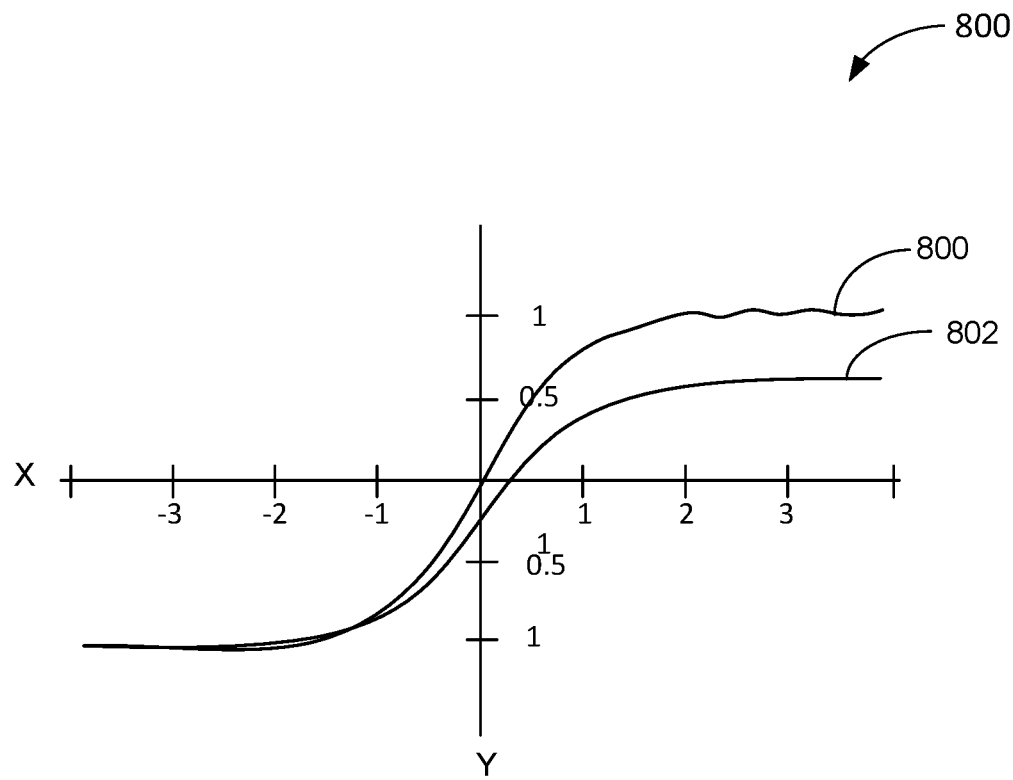
FIG. 8A illustrates the clustering result output by the clustering algorithm of FIG. 7 for the example shown in FIG. 6.

FIG. 8A illustrates the clustering result output by the clustering algorithm of FIG. 7 for the example shown in FIG. 6. In this example, the clustering algorithm 700 generated two clusters: a cluster 800 for the trusted sensor set (average) and another cluster 802 for the divergent sensor.

Figure 8B:
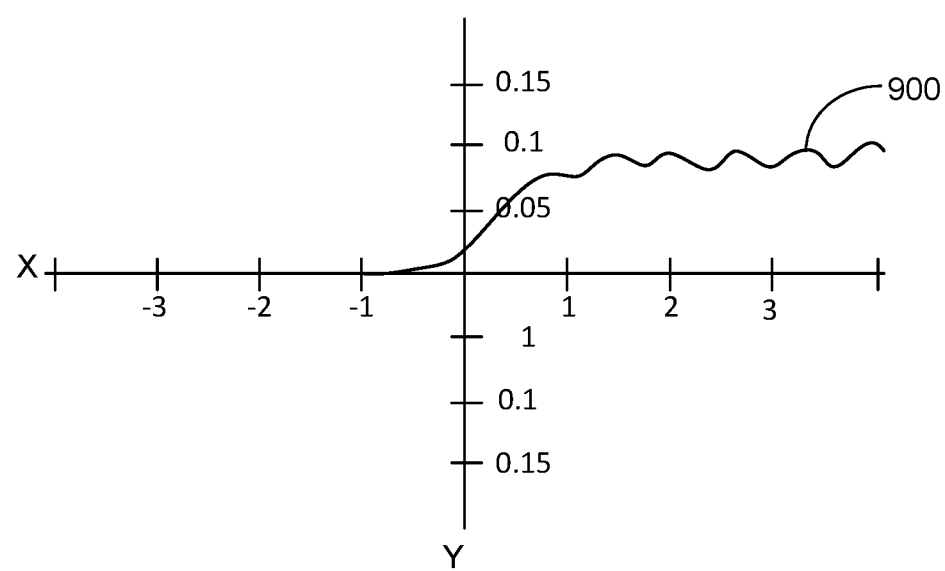
FIG. 8B is a graph illustrating an error metric of the malfunctioning sensor.

FIG. 8B is a graph illustrating an error metric (inverse similarity) of the malfunctioning sensor. By computing the Euclidean distance of the divergent sensor and trusted sensor set average, it is possible to generate an instantaneous error 900 (inverse of similarity/distance metric). Finally, the error metric would be converted into a confidence level, in a normalized range, so that all sensor produce comparable confidence levels. An example normalization would be max( $\overline{C}$, $C_{s,norm}$/error), where $\overline{C}$ is the maximum confidence level and $C_{s,norm}$ is a normalization coefficient specific for sensor S.

Figure 9:
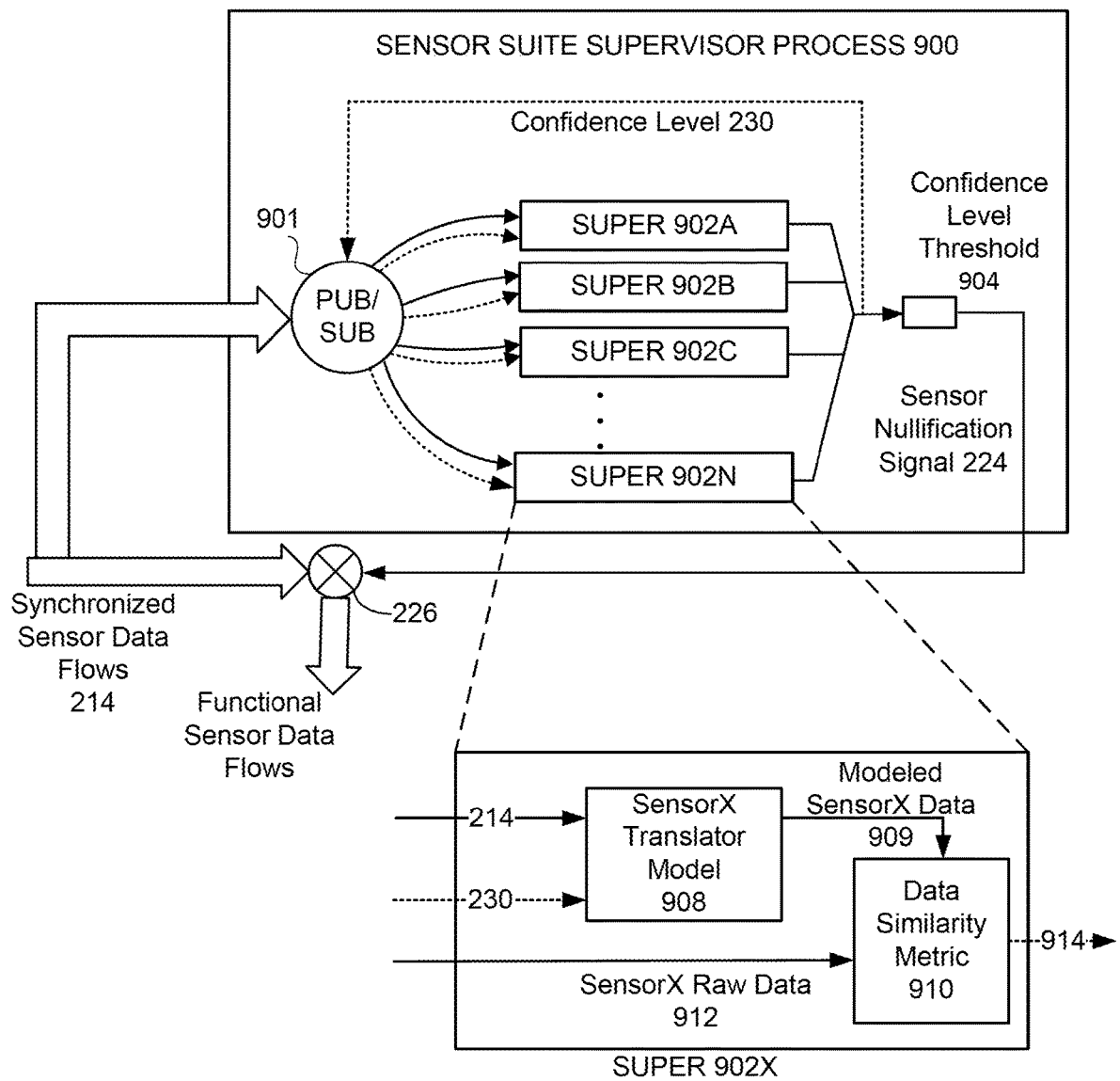
FIG. 9 is a block diagram illustrating an example sensor suite supervisor process based on sensor translator models.

Example 3—Sensor translator model based supervision. FIG. 9 is a block diagram illustrating an example sensor suite supervisor process 900 based on sensor translator models 908, where like components of FIG. 2 have like reference numerals. In this example, for every sensor, the sensor suite supervisor process 900 has a corresponding sensor supervisor process 902A-902N. The sensor supervisor process 902A-902N subscribe to the synchronized sensor data flows 214 through a publish-subscribe (pub/sub) mechanism 901 and determine the confidence levels 230. The confidence level 230 for each of the sensors is compared to a confidence level threshold 904. If the confidence level 230 fails the comparison, then the sensor nullification signal 224 is sent to the sensor data gateway 226.

Each of the sensor supervisor processes 902A-902N has a corresponding multimodal sensor translation model 908 (as shown by the enlarged box for Sensor X). The multimodal sensor translation models 908 are created at design time based on supervised learning. The multimodal sensor translator model 908 receives the sensor data flows 214 from other sensors alongside the current confidence level 230 for sensor X. In this way, the sensor translation model 908 should depend on all its inputs having a high confidence level, otherwise the translation must be aborted. Output of the sensor translator model 908 is modeled sensor data 909 for sensor X. A data similarity metric 910 is defined (which would be dependent on the sensor type and its raw data format), to compare the modeled sensor data 909 with sensor X's actual raw data 912. This similarity metric is used as a confidence level 914 for the sensor X.

Figure 10:
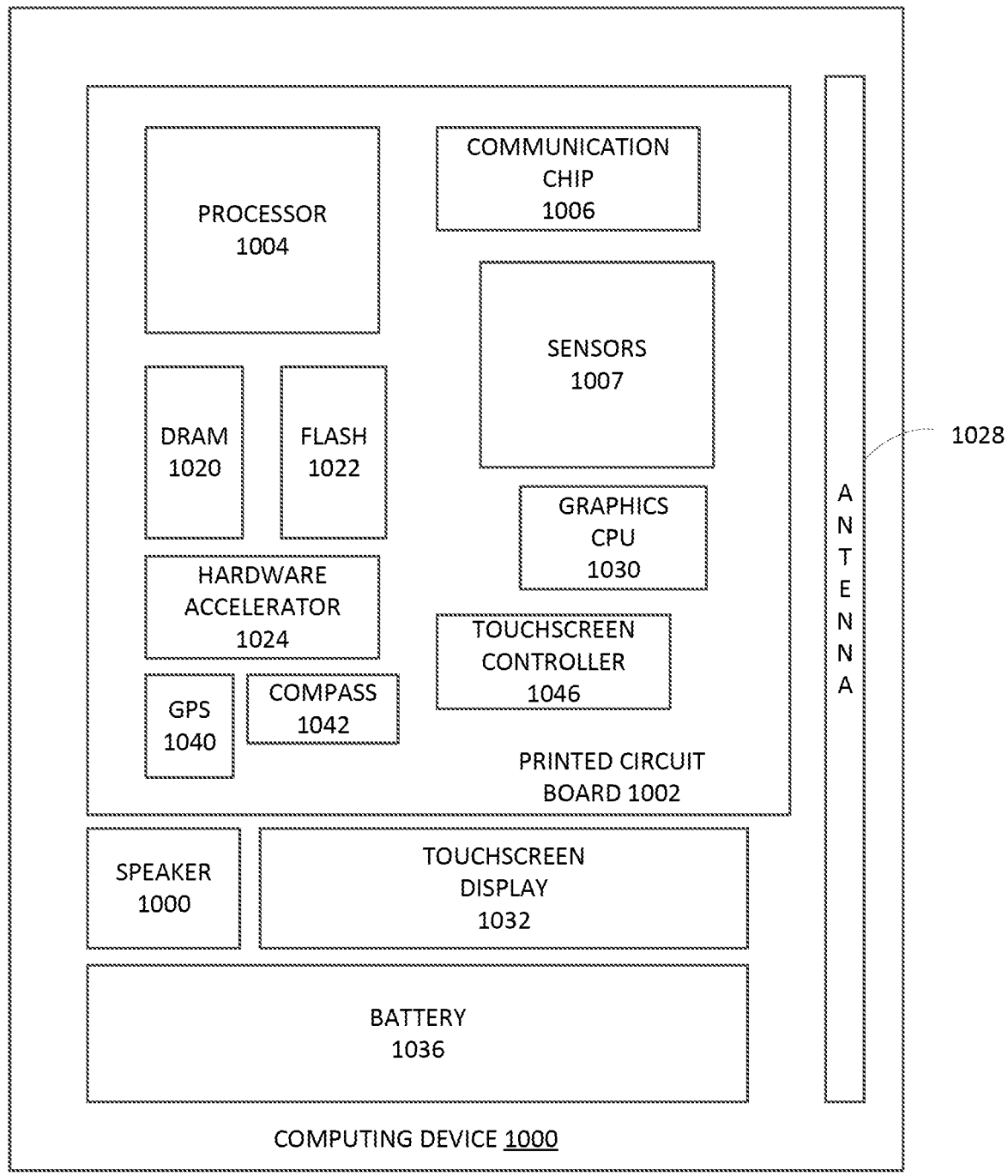
FIG. 10 illustrates an example compute device that may employ the apparatuses and/or methods described herein, according to various embodiments.

FIG. 10 illustrates an example compute device 1000 that may employ the apparatuses and/or methods described herein, according to various embodiments (for instance, any apparatus and/or method associated with any compute device or electronic device described earlier with respect to FIGS. 1-9). In embodiments, the example compute device 1000 may be installed in an autonomous or semi-autonomous vehicles, i.e., self-driving vehicles, UAV, robots, and so forth. As shown, the example compute device 1000 may include a number of components, such as one or more processors 1004 (one shown), at least one communication chip 1006, and sensors 1007 of different types. The at least one communication chip 1006 may have an interface to interface with a network to obtain a trained sensor translation model and/or to receive raw sensor data from additional remote sensors (not shown).

In various embodiments, the one or more processors 1004 each may include one or more processor cores. In various embodiments, the at least one communication chip 1006 may be physically and electrically coupled to the one or more processors 1004. In further implementations, the at least one communication chip 1006 may be part of the one or more processors 1004. In various embodiments, compute device 1000 may include printed circuit board (PCB) 1002. For these embodiments, the one or more processors 1004 and the at least one communication chip 1006 may be disposed thereon.

Depending on its applications, compute device 1000 may include other components that may or may not be physically and electrically coupled to the PCB 1002. These other components include, but are not limited to, a memory controller (not shown), volatile memory (e.g., dynamic random access memory (DRAM) 1020), non-volatile memory such as flash memory 1022, hardware accelerator 1024, an I/O controller (not shown), a digital signal processor (not shown), a crypto processor (not shown), a graphics processor 1030, one or more antenna 1028, a display (not shown), a touch screen display 1032, a touch screen controller 1046, a battery 1036, an audio codec (not shown), a video codec (not shown), a global positioning system (GPS) device 1040, a compass 1042, an accelerometer (not shown), a gyroscope (not shown), a speaker 1000, and a mass storage device (such as hard disk drive, a solid state drive, compact disk (CD), digital versatile disk (DVD)) (not shown), and so forth.

In some embodiments, the one or more processor 1004, DRAM 1020, flash memory 1022, and/or a storage device (not shown) may include associated firmware (not shown) storing programming instructions configured to enable compute device 1000, in response to execution of the programming instructions by one or more processor 1004, to perform methods described herein such as compensating for a sensor deficiency in a heterogeneous sensor array. In various embodiments, these aspects may additionally or alternatively be implemented using hardware separate from the one or more processor 1004 or flash memory 1022, such as hardware accelerator 1024 (which may be a Field Programmable Gate Array (FPGA)). In some embodiments, the hardware accelerator 1024 may be part of processor 1004.

The at least one communication chip 1006 may enable wired and/or wireless communications for the transfer of data to and from the compute device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The at least one communication chip 1006 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 10G, 10G, and beyond. The at least one communication chip 1006 may include a plurality of communication chips 1006. For instance, a first communication chip 1006 may be dedicated to shorter range wireless communications such as Wi-Fi and Bluetooth, and a second communication chip 1006 may be dedicated to longer range wireless communications such as GPS, EDGE, GPRS, CDMA, WiMAX, LTE, Ev-DO, and others.

In various implementations, the compute device 1000 may be a component of a vehicle, a component of a robot, a component of a surveillance system, a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, and/or a digital video recorder. In further implementations, the compute device 1000 may be any other electronic device that processes data.

One or more networks and/or datacenters may be used to generate a sensor translation model to be used by the compute device 1000. These networks and/or datacenters may include a system of distributed compute devices that may each include components similar to any of the compute device 1000 components. The compute devices of the networks and/or datacenters may not require sensors 1007 as such compute devices may receive input sensor data collected from compute device 1000 or some other similar compute device (say a prototype of compute device 1000) with sensors similar to sensors 1007.

Any combination of one or more computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

Example embodiment 1 is an apparatus for autonomous driving that includes an a perception pipeline having independent classification processes operating in parallel to respectively identify an object type based on sensor data flows from multiple ones of a plurality of different types of sensors. The apparatus also includes a sensor monitoring stage to operate in parallel with the perception pipeline and to use the sensor data flows to estimate and track a confidence level of each of the plurality of different types of sensors, and nullify a target sensor when the confidence level associated with the target sensor fails to meet a confidence threshold Example embodiment 2: the apparatus of example embodiment 1, wherein responsive to the deficient sensor being nullified, the sensor monitoring stage sends a sensor control signal to the nullified sensor to attempt to restore the nullified sensor to operable confidence levels, and causes actual sensed data values output by the nullified sensor to be replaced with a nullified value data flow.

Example embodiment 3: the apparatus of example embodiment 2, wherein responsive to one of the classification processes receiving the nullified value data flow as input corresponding to the nullified sensor, the classification process operates in a degraded mode in which the classification process continues to identify objects of the respective object type in absence of the nullified sensor actual sensor data using the sensor data flows of correctly functioning sensors, while maintaining a predetermined accuracy level.

Example embodiment 4: the apparatus of example embodiment 1, 2, or 3, wherein to estimate the confidence level of a target one of the sensors includes to: compare the synchronized sensor data flow of the target sensor to the sensor data flows of a set of statistically related sensors.

Example embodiment 5: the apparatus of example embodiment 4, wherein to compare the synchronized sensor data flow of the target sensor to the sensor data flows of a set of statistically related sensors includes to: access a pre-trained sensor translation model of the target sensor that takes as inputs data of the statistically related reference sensors and generates a predicted output of the target sensor, and calculates a similarity metric between the predicted output and actual target sensor data.

Example embodiment 6: the apparatus of example embodiment 4, wherein to compare the synchronized sensor data flow of the target sensor to the sensor data flows of a set of statistically related sensors includes to: access pre-trained belief networks that compute a posteriori probability estimates of features generated from the target sensor given values for features generated by related sensors.

Example embodiment 7: the apparatus of example embodiment 4, wherein to compare the synchronized sensor data flow of the target sensor to the sensor data flows of a set of statistically related sensors includes to: compute a similarity/distance metric calculated as a weighted average of the pairwise similarities/distances of each pair of sensors in the set of statistically related sensors, including the target sensor; and perform real-time clustering and calculate each sensor's distance to the cluster centroid which represents the confidence level of sensor, wherein an outlier of the cluster represents the deficient sensor.

Example embodiment 8: the apparatus of example embodiment 4, wherein to compare the synchronized sensor data flow of the target sensor to the sensor data flows of a set of statistically related sensors includes: to access parametric non-linear filters to fuse features generated from the target sensor and features from the related sensors into a common state space, and generate confidence level information from an error covariance matrix of a non-linear filter.

Example embodiment 9: the apparatus of example embodiment 1, 2, 3, 4, 5, 6, 7, or 8, wherein to send the sensor control signal includes to send the sensor control signal along a sensor healing feedback path coupled between the plurality of different sensors and the sensor monitoring stage to reconfigure and restore the nullified target sensor to an operable confidence level.

Example embodiment 10: the apparatus of example embodiment 9, wherein when the confidence level associated with the nullified target sensor meets the confidence threshold, the sensor monitoring stage re-enables the target sensor to output normal sensor data flow values to the perception pipeline.

Example embodiment 11: the apparatus of example embodiment 9 or 10, wherein the plurality of different types of sensors include corresponding data pre-processors to extract features from raw sensor data and output pre-processed sensor data flows that are fed to a sensor data synchronization stage to synchronize in time the pre-processed sensor data flows and output the synchronized sensor data flows to the classification stage and the sensor monitoring stage.

Example embodiment 12: the apparatus of example embodiment 11, wherein the sensor monitoring stage sends the sensor control signal to the sensor data pre-processors of the corresponding deficient sensor and to the sensor data synchronization stage.

Example embodiment 13: the apparatus of example embodiment 11 or 12, wherein the sensor monitoring stage sends the sensor control signal only to the sensor data pre-processors and the sensor data synchronization stage when the sensors are operating correctly but the sensor data pre-processors need to be tuned, or the sensor data synchronization stage needs to be re-synchronized.

Example embodiment 14: the apparatus of example embodiment 1, 2, 3, 4, or 9, wherein the classification processes are pre-trained to maintain a predetermined accuracy level during operation over all required combinations of sensor deficiencies, wherein the sensor data flow of any deficient sensor is replaced by the nullified value data to simplify the training.

Example embodiment 15 is a method for autonomous vehicles that comprises identifying objects belonging to a specific object type based on sensor data flows from multiple ones of a plurality of different types of sensors using respective independent classification processes operating in parallel. A confidence level of each of the plurality of different types of sensors is estimated and tracked from the sensor data flows in parallel with identifying object types, and nullifying a deficient sensor when the confidence level associated with the deficient sensor fails to meet a confidence threshold.

Example embodiment 16: the apparatus of example embodiment 15, further comprising: responsive to the deficient sensor being nullified, sending a sensor control signal to the nullified deficient sensor to attempt to restore the nullified sensor to operable confidence levels, and causing actual sensed data values output by the nullified deficient sensor to be replaced with a nullified value data flow.

Example embodiment 17: the apparatus of example embodiment 16, wherein responsive to one of the classification processes receiving the nullified value data flow as input corresponding to the nullified deficient sensor, operating the classification process in a degraded mode in which the classification process continues to identify objects of the respective object type in absence of the nullified deficient sensor using the sensor data flows of correctly functioning sensors, while maintaining a predetermined accuracy level.

Example embodiment 18: the apparatus of example embodiment 15, 16, or 17 wherein to estimate the confidence level of a target one of sensors further comprises: comparing the synchronized sensor data flow of the target sensor to the sensor data flows of a set of statistically related sensors.

Example embodiment 19: the apparatus of example embodiment 18, wherein comparing the synchronized sensor data flow of the target sensor to the sensor data flows of a set of statistically related sensors further comprises: accessing a pre-trained sensor translation model of the target sensor that takes as inputs data of the statistically related reference sensors and generates a predicted output of the deficient sensor, and calculates a similarity metric between the predicted output and actual target sensor data.

Example embodiment 20: the apparatus of example embodiment 18, wherein comparing the synchronized sensor data flow of the target sensor to the sensor data flows of a set of statistically related sensors further comprises: accessing a pre-trained belief networks that compute a posteriori probability estimates of features generated from the target sensor given values for features generated by related sensors.

Example embodiment 21: the apparatus of example embodiment 18, wherein comparing the synchronized sensor data flow of the target sensor to the sensor data flows of a set of statistically related sensors further comprises: computing a similarity/distance metric calculated as a weighted average of the pairwise similarities/distances of each pair of sensors in the set of statistically related sensors, including the target sensor; and performing real-time clustering and calculate each sensor's distance to the cluster centroid that represents the confidence level of the sensor, wherein an outlier of the cluster represents the deficient sensor.

Example embodiment 22: the apparatus of example embodiment 18, wherein comparing the synchronized sensor data flow of the deficient sensor to the sensor data flows of a set of statistically related sensors further comprises: accessing a parametric non-linear filters to fuse features generated from the target sensor and features from the related sensors into a common state space, and generating confidence level information from an error covariance matrix of a non-linear filter.

Example embodiment 23: the apparatus of example embodiment 15, 16, 17, 18, 19, 20, 21, or 22 wherein to send the sensor control signal includes to send the sensor control signal along a sensor healing feedback path coupled between the plurality of different sensors and the sensor monitoring stage to reconfigure and restore the nullified target sensor to an operable confidence level.

Example embodiment 24: the apparatus of example embodiment 23, wherein when the confidence level associated with the nullified target sensor meets the confidence threshold, the sensor monitoring stage re-enables the target sensor to output normal sensor data flow values to the perception pipeline.

Example embodiment 25: the apparatus of example embodiment 23 or 24, wherein the plurality of different types of sensors include corresponding data pre-processors to extract features from raw sensor data and output pre-processed sensor data flows that are fed to a sensor data synchronization stage to synchronize in time the pre-processed sensor data flows and output the synchronized sensor data flows to the classification stage and the sensor monitoring stage.

Example embodiment 26: the apparatus of example embodiment 25, wherein the sensor monitoring stage sends the sensor control signal to the sensor data pre-processors of the corresponding deficient sensor and to the sensor data synchronization stage.

Example embodiment 27: the apparatus of example embodiment 25 or 26, wherein the sensor monitoring stage sends the sensor control signal only to the sensor data pre-processors and the sensor data synchronization stage when the sensors are operating correctly but the sensor data pre-processors need to be tuned, or the sensor data synchronization stage needs to be re-synchronized.

Example embodiment 28: the apparatus of example embodiment 15, 16, 17, 18, or 23 wherein the classification processes are pre-trained to maintain a predetermined accuracy level during operation over all required combinations of sensor deficiencies, wherein the sensor data flow of any deficient sensor is replaced by the nullified value data to simplify the training.

Example embodiment 29: A computer readable media comprising executable instructions, wherein the instructions, in response to execution by a processor, cause the processor to identify objects belonging to a specific object type based on sensor data flows from multiple ones of a plurality of different types of sensors using respective independent classification processes operating in parallel. A confidence level of each of the plurality of different types of sensors is estimated and tracked from the sensor data flows in parallel with identifying object types, and nullify a deficient sensor when the confidence level associated with the deficient sensor fails to meet a confidence threshold.

Example embodiment 30: the apparatus of example embodiment 29, wherein the instructions further cause the processor to: responsive to the deficient sensor be nullified, send a sensor control signal to the nullified deficient sensor to attempt to restore the nullified sensor to operable confidence levels, and cause actual sensed data values output by the nullified deficient sensor to be replaced with a nullified value data flow.

Example embodiment 31: the apparatus of example embodiment 30, wherein the instructions further cause the processor to: responsive to one of the classification processes receiving the nullified value data flow as input corresponding to the nullified deficient sensor, operate the classification process in a degraded mode in which the classification process continues to identify the respective object type in absence of the nullified deficient sensor actual sensor data using the sensor data flows of correctly functioning sensors, while maintaining a predetermined accuracy level.

Example embodiment 32: the apparatus of example embodiment 29, 30 or 31 wherein to estimate the confidence level of a target one of the sensors further includes to: compare the synchronized sensor data flow of the target sensor to the sensor data flows of a set of statistically related sensors.

Example embodiment 33: An apparatus for autonomous vehicles, comprises a perception pipeline having independent classification processes operating in parallel to respectively identify objects belonging to a specific object type based on sensor data flows from multiple ones of a plurality of different types of sensors. A sensor monitoring stage means to operate in parallel with the perception pipeline and to use the sensor data flows to estimate and track a confidence level of each of the plurality of different types of sensors, and nullify a deficient sensor when the confidence level associated with the deficient sensor fails to meet a confidence threshold.

Example embodiment 34: the apparatus of example embodiment 33, wherein responsive to the deficient sensor being nullified, the sensor monitoring stage means sends a sensor control signal to the nullified sensor to attempt to restore the nullified sensor to operable confidence levels, and causes actual sensed data values output by the nullified sensor to be replaced with a nullified value data flow.

Example embodiment 35: the apparatus of example embodiment 34, wherein responsive to one of the classification processes receiving the nullified value data flow as input corresponding to the nullified sensor, the classification process operates in a degraded mode in which the classification process continues to identify objects of the respective object type in absence of the nullified sensor actual sensor data using the sensor data flows of correctly functioning sensors, while maintaining a predetermined accuracy level.

Example embodiment 36: the apparatus of example embodiment 33 or 34 wherein to estimate the confidence level of a target one of the sensors includes to: compare the synchronized sensor data flow of the target sensor to the sensor data flows of a set of statistically related sensors.

Example embodiment 37: A multimodal sensor perception pipeline apparatus for autonomous vehicle comprises a data acquisition stage to acquire data from a plurality of different types of sensors and output synchronized sensor data flows corresponding to the plurality of different types of sensors. A multimodal classification stage having a plurality of classification processes identifies in parallel distinct object types based on the synchronized sensor data flows from multiple ones of the plurality of different types of sensors. A sensor monitoring stage to operate in parallel with the data acquisition stage and the multimodal classification state inputs the synchronized sensor data flows to estimate and track a confidence level of each of the plurality of different types of sensors. A deficient sensor is nullified when the confidence level associated with the deficient sensor fails to meet a confidence threshold. A sensor healing feedback path responsive to nullification of the deficient sensor sends a sensor control signal to the nullified deficient sensor to attempt to restore the nullified deficient sensor to operable confidence levels.

Example embodiment 38: the apparatus of example embodiment 37, wherein responsive to the deficient sensor being nullified, the sensor monitoring stage causes actual sensed data values output by the nullified deficient sensor to be replaced with a nullified value data flow.

Example embodiment 39: the apparatus of example embodiment 38, wherein responsive to one of the classification processes receiving the nullified value data flow as input for the nullified deficient sensor, the classification process operates in a degraded mode in which the classification process continues to identify the respective object type in absence of the nullified deficient sensor actual sensor data using the sensor data flows of correctly functioning sensors, while maintaining a predetermined accuracy level.

Example embodiment 40: the apparatus of example embodiment 37, 38 or 39 wherein to estimate the confidence level of a target one of the sensors includes to: compare the synchronized sensor data flow of the target sensor to the sensor data flows of a set of statistically related sensors.

What is claimed is:

1. An apparatus for autonomous driving, comprising:
a perception pipeline having independent classification processes operating in parallel to respectively identify objects based on sensor data flows from multiple ones of a plurality of sensors disposed in a vehicle; and
a sensor monitoring stage to operate in parallel with the perception pipeline and to use the sensor data flows to estimate and track a confidence level of each of the plurality of sensors, and nullify a deficient sensor when the confidence level associated with the deficient sensor fails to meet a confidence threshold.

2. The apparatus of claim 1, wherein responsive to the deficient sensor being nullified, the sensor monitoring stage is to:
send a sensor control signal to the nullified sensor to attempt to restore the nullified sensor to operable confidence levels; and
cause actual sensed data values output by the nullified sensor to be replaced with a nullified value data flow.

3. The apparatus of claim 2, wherein responsive to one of the classification processes receiving the nullified value data flow as input corresponding to the nullified sensor, the classification process is to operate in a degraded mode in which the classification process continues to identify the objects in absence of the nullified sensor actual sensor data using the sensor data flows of correctly functioning sensors, while maintaining a predetermined accuracy level.

4. The apparatus of claim 1, wherein, to estimate the confidence level of a target sensor of the plurality of sensors, the sensor monitoring stage is to:
compare a synchronized sensor data flow of the target sensor to sensor data flows of a set of statistically related sensors.

5. The apparatus of claim 4, wherein, to compare the synchronized sensor data flow of the target sensor to the sensor data flows of the set of statistically related sensors, the sensor monitoring stage is to:
access a pre-trained sensor translation model of the target sensor that takes, as inputs, data of the set of statistically related sensors;
generate a predicted output of the target sensor; and
calculate a similarity metric between the predicted output and actual target sensor data.

6. The apparatus of claim 4, wherein, to compare the synchronized sensor data flow of the target sensor to the sensor data flows of the set of statistically related sensors, the sensor monitoring stage is to:
access pre-trained belief networks that compute a posteriori probability estimates of features generated from the target sensor given values for features generated by related sensors.

7. The apparatus of claim 4, wherein, to compare the synchronized sensor data flow of the target sensor to the sensor data flows of the set of statistically related sensors, the sensor monitoring stage is to:
compute a similarity/distance metric calculated as a weighted average of pairwise similarities/distances of each pair of sensors in the set of statistically related sensors, including the target sensor;
perform real-time clustering; and
calculate each sensor's distance to a cluster centroid that represents the confidence level of sensor, wherein an outlier of the cluster represents the deficient sensor.

8. The apparatus of claim 4, wherein, to compare the synchronized sensor data flow of the target sensor to the sensor data flows of the set of statistically related sensors, the sensor monitoring stage is to:
access parametric non-linear filters to fuse features generated from the target sensor and
features from the related sensors into a common state space; and
generate confidence level information from an error covariance matrix of a non-linear filter.

9. The apparatus of claim 2, wherein, to send the sensor control signal, the sensor monitoring stage is to:
send the sensor control signal along a sensor healing feedback path coupled between the plurality of sensors and the sensor monitoring stage to reconfigure and restore a nullified target sensor to an operable confidence level.

10. The apparatus of claim 9, wherein when the confidence level associated with the nullified target sensor meets the confidence threshold, the sensor monitoring stage re-enables the target sensor to output normal sensor data flow values to the perception pipeline.

11. The apparatus of claim 9, wherein the plurality of sensors include corresponding data pre-processors to extract features from raw sensor data and output pre-processed sensor data flows that are fed to a sensor data synchronization stage to synchronize in time the pre-processed sensor data flows and output the synchronized sensor data flows to the classification stage and the sensor monitoring stage.

12. The apparatus of claim 11, wherein the sensor monitoring stage sends the sensor control signal to the sensor data pre-processors of the deficient sensor and to the sensor data synchronization stage.

13. The apparatus of claim 12, wherein the sensor monitoring stage sends the sensor control signal only to the sensor data pre-processors and the sensor data synchronization stage when the sensors are operating correctly but the sensor data pre-processors need to be tuned, or the sensor data synchronization stage needs to be re-synchronized.

14. The apparatus of claim 2, wherein the perception pipeline and the sensor monitoring stage are disposed in the vehicle, wherein the classification processes are pre-trained to maintain a predetermined accuracy level during operation over all required combinations of sensor deficiencies, and wherein the sensor data flow of any deficient sensor is replaced by the nullified value data flow to simplify training.

15. A method for autonomous driving, comprising:
identifying objects based on sensor data flows from multiple ones of a plurality of sensors disposed in a vehicle, using respective independent classification processes operating in parallel; and
estimating and tracking a confidence level of each of the plurality of sensors from the sensor data flows in parallel with identifying an object type of the identified objects, and nullifying a deficient sensor when the confidence level associated with the deficient sensor fails to meet a confidence threshold.

16. The method of claim 15, further comprising:
responsive to the deficient sensor being nullified, sending a sensor control signal to the nullified deficient sensor to attempt to restore the nullified sensor to operable confidence levels, and causing actual sensed data values output by the nullified deficient sensor to be replaced with a nullified value data flow.

17. The method of claim 16, wherein responsive to one of the classification processes receiving the nullified value data flow as input corresponding to the nullified deficient sensor, operating the classification process in a degraded mode in which the classification process continues to identify the objects in absence of the nullified deficient sensor using the sensor data flows of correctly functioning sensors, while maintaining a predetermined accuracy level.

18. The method of claim 15, wherein to estimate the confidence level of a target one of sensors further comprises: comparing a synchronized sensor data flow of a target sensor to the sensor data flows of a set of statistically related sensors.

19. The method of claim 18, wherein comparing the synchronized sensor data flow of the target sensor to the sensor data flows of a set of statistically related sensors further comprises:
accessing a pre-trained sensor translation model of the target sensor that takes as inputs data of the statistically related sensors and generates a predicted output of the deficient sensor, and calculates a similarity metric between the predicted output and actual target sensor data.

20. The method of claim 18, wherein comparing the synchronized sensor data flow of the target sensor to the sensor data flows of a set of statistically related sensors further comprises:
accessing a pre-trained belief networks that compute a posteriori probability estimates of features generated from the target sensor given values for features generated by related sensors.

21. The method of claim 18, wherein comparing the synchronized sensor data flow of the target sensor to the sensor data flows of a set of statistically related sensors further comprises:
computing a similarity/distance metric calculated as a weighted average of the pairwise similarities/distances of each pair of sensors in the set of statistically related sensors, including the target sensor; and
performing real-time clustering and calculate each sensor's distance to the cluster centroid that represents the confidence level of the sensor, wherein an outlier of the cluster represents the deficient sensor.

22. A computer readable media comprising executable instructions, wherein the instructions, in response to execution by a processor of an in-vehicle system (IVS) disposed in a vehicle, cause the IVS to:
identify objects based on sensor data flows from multiple ones of a plurality of sensors disposed in the vehicle, using respective independent classification processes operating in parallel; and
estimate and track a confidence level of each of the plurality of sensors from the sensor data flows in parallel with identifying an object type of the identified objects, and nullify a deficient sensor when the confidence level associated with the deficient sensor fails to meet a confidence threshold.

23. The computer readable media of claim 22, wherein the instructions further cause the IVS to:
responsive to the deficient sensor be nullified, send a sensor control signal to the nullified deficient sensor to attempt to restore the nullified sensor to operable confidence levels, and cause actual sensed data values output by the nullified deficient sensor to be replaced with a nullified value data flow.

24. A multimodal sensor perception pipeline apparatus for an autonomous vehicle, comprising:
a data acquisition stage disposed in the autonomous vehicle to acquire data from a plurality of sensors disposed in the autonomous vehicle, and output synchronized sensor data flows corresponding to the plurality of sensors;
a multimodal classification stage disposed in the autonomous vehicle, and having a plurality of classification processes to identify in parallel objects based on the synchronized sensor data flows from multiple ones of the plurality of sensors;
a sensor monitoring stage disposed in the autonomous vehicle to operate in parallel with the data acquisition stage and the multimodal classification state that inputs the synchronized sensor data flows to estimate and track a confidence level of each of the plurality of sensors; and nullify a deficient sensor when the confidence level associated with the deficient sensor fails to meet a confidence threshold; and
a sensor healing feedback path disposed in the autonomous vehicle, responsive to nullification of the deficient sensor to send a sensor control signal to the nullified deficient sensor to attempt to restore the nullified deficient sensor to operable confidence levels.

25. The apparatus of claim 24, wherein responsive to the deficient sensor being nullified, the sensor monitoring stage causes actual sensed data values output by the nullified deficient sensor to be replaced with a nullified value data flow.

* * * * *

UNITED STATES PATENT AND TRADEMARK OFFICE
CERTIFICATE OF CORRECTION

PATENT NO. : 11,320,810 B2
APPLICATION NO. : 16/634542
DATED : May 3, 2022
INVENTOR(S) : Arditti Ilitzky et al.

It is certified that error appears in the above-identified patent and that said Letters Patent is hereby corrected as shown below:

In the Specification

Column 20
Lines 50-51, "...a posteriori probability estimates..." should read "...posteriori probability estimates..."

In the Claims

Column 22
Lines 4-6, "access parametric non-linear filters to fuse features generated from the target sensor and
features from the related sensors into a common state space; and
generate confidence level information from an error..." should read "access parametric non-linear filters to fuse features generated from the target sensor and features from the related sensors into a common state space; and
generate confidence level information from an error..."

Column 23
Lines 23-24, "...a posteriori probability estimates..." should read "...posteriori probability estimates..."

Column 23
Line 35, "performing real-time clustering and calculate each sensor's..." should read "...performing real-time clustering and calculating each sensor's..."

Signed and Sealed this
Twelfth Day of July, 2022

*Katherine Kelly Vidal*
Katherine Kelly Vidal
*Director of the United States Patent and Trademark Office*